Aug. 26, 1952 — C. A. WILLIAMSON — 2,608,394
CONTINUOUS MIXER
Filed Aug. 1, 1951 — 3 Sheets-Sheet 1
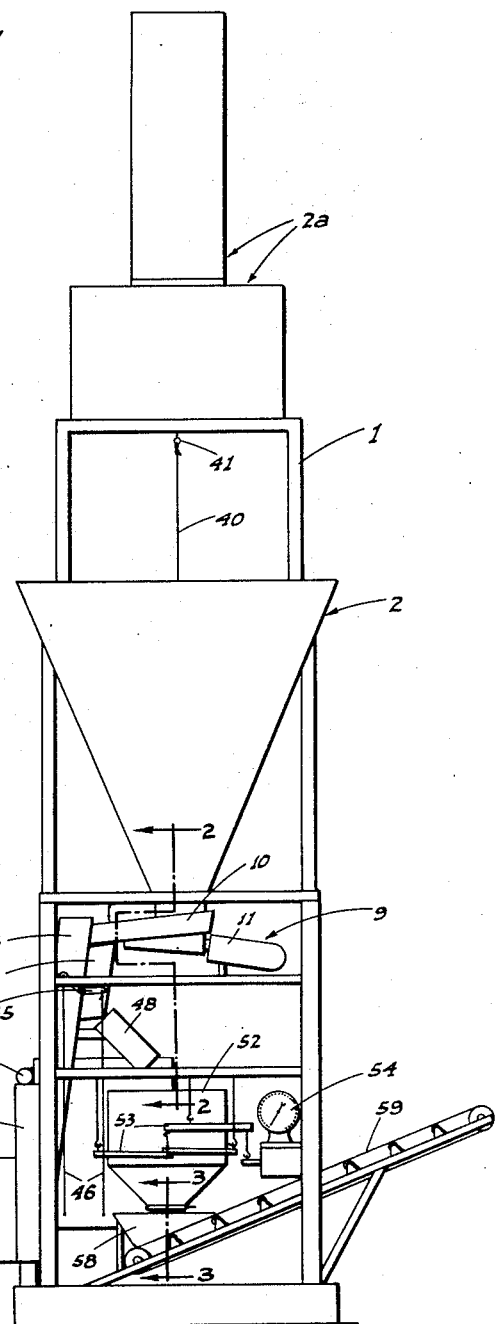
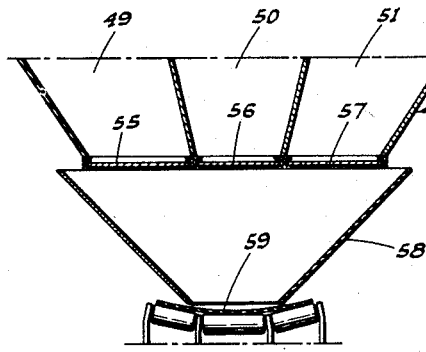
INVENTOR
C. A. Williamson
BY
ATTORNEYS Aug. 26, 1952 — C. A. WILLIAMSON — 2,608,394
CONTINUOUS MIXER
Filed Aug. 1, 1951 — 3 Sheets-Sheet 2

INVENTOR
C. A. Williamson
BY Webster & Webster
ATTORNEYS

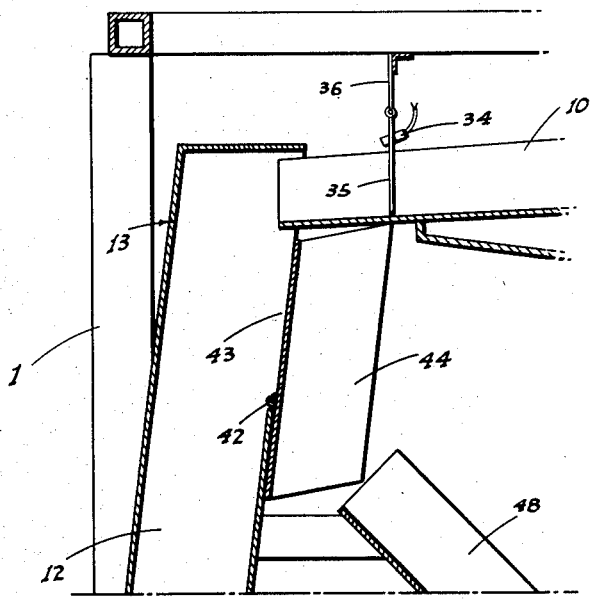
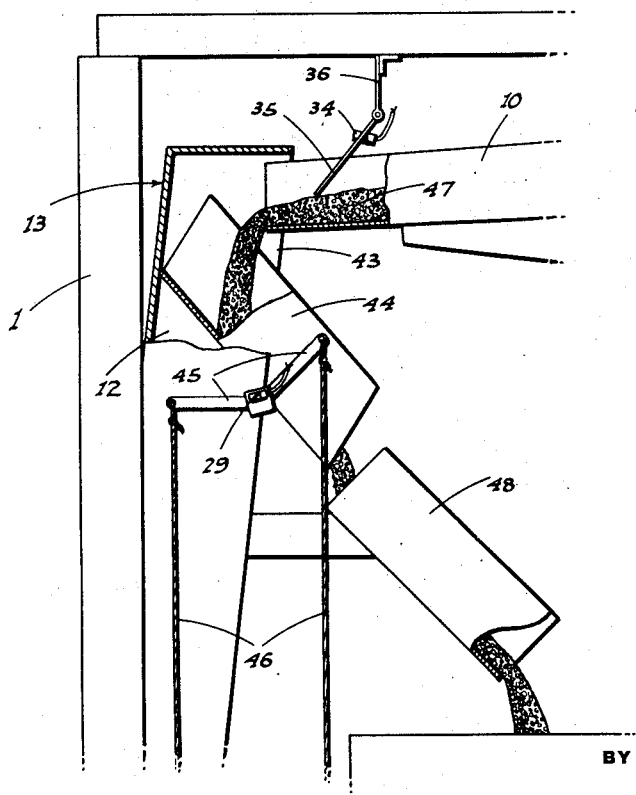

Patented Aug. 26, 1952

2,608,394

UNITED STATES PATENT OFFICE 2,608,394

CONTINUOUS MIXER

Crawford A. Williamson, Sacramento, Calif., assignor to A. Teichert & Son, Inc., Sacramento, Calif., a corporation of California Application August 1, 1951, Serial No. 239,759

8 Claims. (Cl. 259—154)

This invention is directed to, and it is an object to provide, an improved stationary type mixing plant for use to continuously prepare road surfacing material comprised of aggregate and a bituminous binder.

Another important object of the invention is to provide a continuous mixing plant, for road surfacing material, which embodies a novel multiple bin and feeder assembly operative to feed a plurality of grades of aggregate each in selectively and accurately controlled quantity to the mixing apparatus of the plant.

A further object of the invention is to provide the rotary mixer or pugmill, which said mixing apparatus includes, with a counterweighted baffle door at the discharge end of said mixer, whereby to retard the mix and prevent too free delivery thereof out of the mixer.

An additional object of the invention is to provide the continuous mixing plant with a novel sample-taking and weighing mechanism arranged to function without shutting down the plant; there being means to automatically discontinue the flow of bituminous binder to the mixing apparatus during the period of sample taking, and at which time the aggregate does not deliver to said apparatus.

A separate object of the invention is to provide novel means to automatically discontinue operation of the entire multiple bin and feeder assembly should one bin become empty or clog.

It is also an object of the invention to provide a practical and reliable continuous mixing plant for road material, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the improved mixing plant.

Fig. 3 is an enlarged, fragmentary transverse section on line 3—3 of Fig. 1.

Fig. 4 is a fragmentary sectional elevation on line 4—4 of Fig. 2, showing the sample-taking chute in normal position out of use.

Fig. 5 is a similar view but shows the sample-taking chute swung to its position of use.

Figure 2:
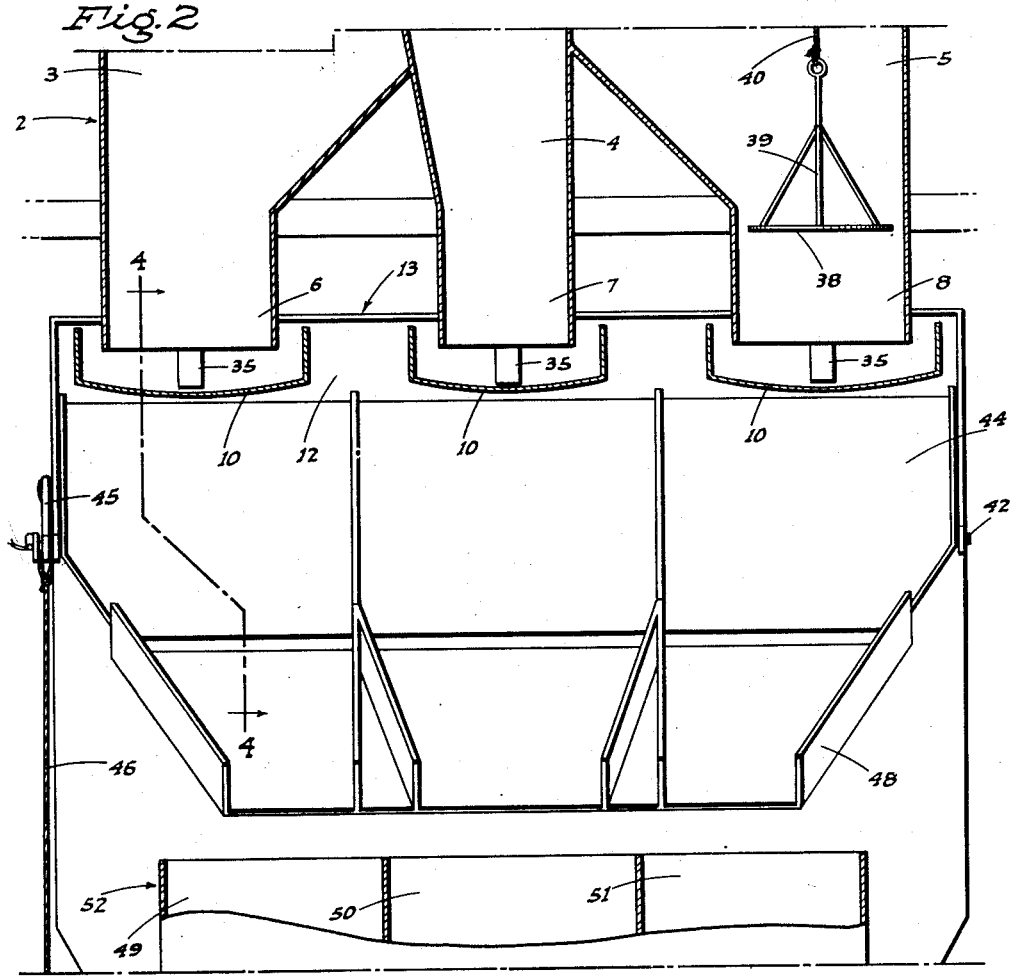
Fig. 2 is an enlarged, fragmentary transverse section on line 2—2 of Fig. 1.
Figure 6:
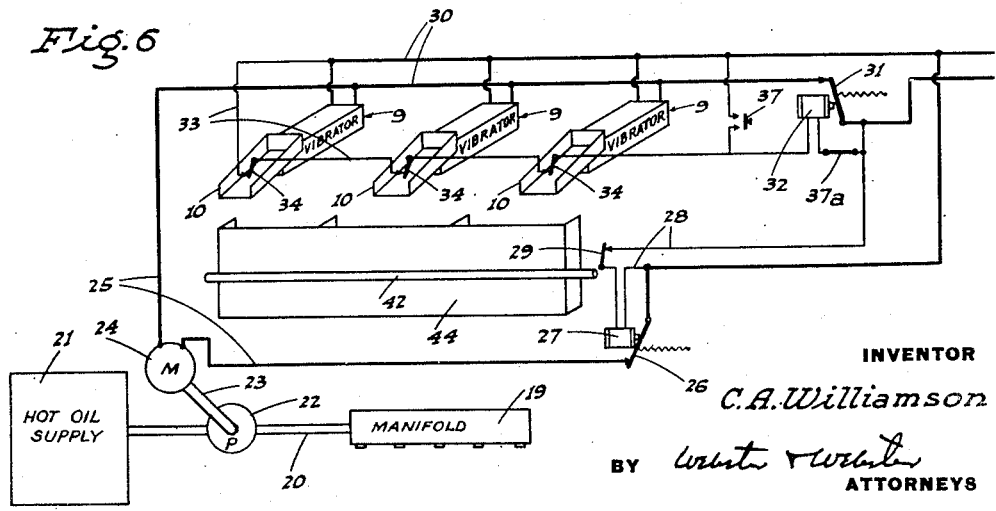
Fig. 6 is a diagram of the control circuits.

Referring now more particularly to the characters of reference on the drawings, the improved mixing plant, for road surfacing material, comprises a rigid upstanding frame 1 of substantial height; there being a compartmented bin 2 mounted in such frame intermediate the top and bottom thereof. The bin 2 includes three bin compartments, indicated at 3, 4, and 5, and each of such bin compartments includes a downwardly extending discharge spout, the latter being indicated at 6, 7, and 8, respectively.

The bin compartment 3 is adapted to contain the largest screen size aggregate; the bin compartment 4 to contain the middle screen size aggregate; and the bin compartment 5 to contain the smallest screen size aggregate. Such aggregates are fed to the compartmented bin 2 by a hot-aggregate feeding and screening assembly, indicated generally at 2a.

A vibratory feeder 9 is disposed below each of the spouts 6, 7, and 8, and each such feeder includes a feeder pan 10 in position to receive material from the corresponding spout, and each pan is actuated by an electrically energized vibrator 11. The vibratory or shaker feeders 9 are of a type adjustable to vary the rate of flow, and may be of the type which are commercialized under the trademark "Syntron."

The feeder pans 10, of which there are three in side by side relation, each discharge into the passage 12 of an outwardly inclined, aggregate chute 13; the latter delivering, at its lower end, into the receiving housing 14 of a rotary mixer or pugmill 15. At the opposite end such rotary mixer or pugmill 15 is fitted with a counterweighted baffle door 16 whose purpose is to retard the mix and prevent too free delivery thereof out of said mixer; the counterweight being indicated at 17.

From the discharge end of the mixer 15 the mix feeds into a carry-off conveyor 18.

When the plant is in operation, the aggregate—in selective proportions from the bin compartments 3, 4, and 5—is fed by the vibratory feeders 9, and particularly the feeder pans 10, into the aggregate chute 13; the aggregate as received in the housing 14 being continuously sprayed with a liquid bituminous binder delivered from a spray manifold 19. The amount of the liquid bituminous binder is directly and accurately proportioned relative to the quantity of aggregate fed to the receiving housing 14 and rotary mixer or pugmill 15; such feeding of the binder being through a feed pipe 20 connected between a supply tank 21 and said manifold 19; there being a positive displacement pump 22 interposed in the feed pipe 20 and driven by a power connection 23 from an electric motor 24.

The electric motor 24 is connected to a motor energizing circuit 25 having a solenoid-controlled switch 26 interposed therein, and the solenoid of such switch is indicated at 27.

In turn, the solenoid 27 is connected to a solenoid control circuit 28 having a switch 29 therein; the switch 26 and the switch 29 being closed when the plant is in normal operation. The purpose of the switch 29 will hereinafter appear.

As it is requisite that a proportioned amount of the aggregate constantly feed from each of the vibratory feeders 9, the following safety circuit is provided:

The electrically energized vibrators 11 are connected in parallel to a vibrator energizing circuit 30 having a solenoid controlled switch 31 therein; the solenoid of such switch being indicated at 32.

The switch 31 is closed when the plant is in normal operation, being maintained in such position by energization of the solenoid 32 through the medium of a solenoid control circuit 33. The solenoid control circuit 33 is provided, in one side thereof, with three switches 34, all connected in series. The switches 34 are of mercury type, and each is mounted on a swing gate 35 pivotally suspended from a bracket 36 and depending into a corresponding one of the feeder pans 10. When aggregate is feeding through each pan, the corresponding gate 35 is swung forwardly and upwardly, as in Fig. 5, closing the related switch 34. Thus, when all of the switches 34 are closed, the circuit 33 is likewise closed, energizing the solenoid 32 and closing the switch 31, energizing the vibrators 11. However, the moment the aggregate feed fails in any one of the feeder pans 10, the related gate 35 swings down (as in Fig. 4) and the switch 34 thereon opens, breaking the solenoid control circuit 33 and causing solenoid 32 to deenergize, whereupon switch 31 opens and the vibrators 11 all cease functioning. Thus, a safety circuit is provided which assures that the plant remains in operation only when all of the feeders 9 have an aggregate flow therethrough. This is extremely important, as otherwise the proportionate amount of aggregates in the mix would not be maintained.

In order to initially energize the solenoid 32, as in the first few moments of the operation of the plant, and until the aggregates begin to flow, a push button switch 37 is closed in parallel between opposite sides of the solenoid control circuit 33. However, as soon as the aggregates begin to flow and each of the switches 34 close, the switch 37 is released and permitted to open.

Also, a manual switch 37a is interposed in solenoid circuit 33; such switch 37a being closed when the plant is in operation, but when emergency or other conditions require is manually opened, breaking the circuit, causing switch 31 to open and feeders 9 to cease functioning.

The compartment 5 of the pin 2 contains the aggregate of smallest screen size, which aggregate—by reason of such small size—may have a tendency to flush through the spout 8 and off the related feeder pan 10, even when the latter is not being vibrated. To avoid this undesirable flushing of the aggregate, a horizontal baffle disc 38, of somewhat lesser diameter than the inside diameter of the spout 8, is suspended in the latter by means of an upstanding center rod 39 fixed to said disc, and a suspension cable 40 connected between the upper end of the rod 39 and a high point 41 on the frame 1. With this arrangement the horizontal baffle disc 38 is free to swing in the spout 8 so that it hunts the flowing material and retards its too rapid discharge or flushing from such spout.

At certain intervals during the operation of the plant it is required that a sample of the aggregates be taken for the purpose of weighing, testing, etc., and the present invention provides a novel sample-taking and weighing mechanism, as follows:

The aggregate chute 13 is initially open for a distance on the back side immediately below all of the feeder pans 10, and a cross shaft 42 is journaled in connection with said back side of the chute 13 in spanning relation thereon at the bottom of said opening; the latter being indicated at 43.

A multiple-trough sample-taking chute 44 is disposed immediately below the feeder pans 10, normally being in an upstanding position, as in Fig. 4, closing the opening 43, and being fixed to the shaft 42; there being a trough corresponding to and below each feeder 9.

At one end the cross shaft 42 is fitted with opposed lever arms 45, each provided with a depending pull cord 46. By manipulation of the pull cords 46, the sample-taking chute 44 can be caused to swing from an upstanding inoperative position, as in Fig. 4, forwardly into the passage 12 of the chute 13, as in Fig. 5.

When this occurs, the streams 47 of aggregate flowing from the feeder pans 10 are all three caught by corresponding troughs of the chute 44 and diverted into fixed troughs 48 mounted on the upstanding frame 1.

From the fixed troughs 48 the diverted streams 47 discharge into corresponding compartments 49, 50, and 51 of a compartmented scale bin 52.

The compartmented scale bin 52 is suspended in the lower portion of the frame 1 below the fixed troughs 48 by a scale beam assembly 53, which scale beam assembly is connected in actuating relation to a scale unit 54. By reading the scale unit 54 the total weight of the aggregates taken as samples into the compartmented scale bin 52 can be accurately determined. After a certain weight of the aggregates has been taken as a sample, the sample-taking chute 44 is swung to its normal upstanding inoperative position, whereupon the aggregates again feed downwardly in the aggregate chute 13 so that the plant may continue in operation.

Each of the compartments 49, 50, and 51 is fitted—at the bottom—with a gate, which gates are indicated at 55, 56, and 57. By manipulation of said gates, the aggregate samples from the compartments 49, 50, and 51 can be separately or simultaneously discharged; the discharged aggregates falling into a fixed hopper 58, which in turn delivers to a carry-off conveyor 59 mounted in the frame 1 and leading therefrom at an upward and outward incline.

It will thus be recognized that with the described sample-taking and weighing mechanism, samples of the aggregate can be taken, weighed, tested, etc., positively, accurately, and effectively, without shutting down operation of the mixing plant; it being requisite, however, that the liquid bituminous binder as discharged or sprayed from the manifold 19 be shut off during the time that samples are being taken. This is for the reason that otherwise the proportion of the bituminous binder would not be accurately maintained, and too much of such binder would discharge into the rotary mixer or pugmill 15 during each sample-taking operation.

The following arrangement is provided to automatically discontinue the flow of bituminous binder from the manifold 19 when a sample of the aggregates is being taken:

The switch 29, which is preferably of mercury type, is mounted at one end of the cross shaft 42, such switch being closed when the sample-taking chute 44 is upright and inoperative, as in Fig. 4, but open when said sample-taking chute 44 is swung to a sample-taking position, as in Fig. 5.

When samples are being taken and switch 29 is open, as aforesaid, the solenoid control circuit 28 is broken, deenergizing the solenoid 27 and resulting in the switch 26 opening. When switch 26 opens, the motor energizing circuit 25 is broken, and the pump drive motor 24 ceases to function, with the result that the pump 22 does not feed to the manifold 19. As a consequence, no bituminous binder is fed to such manifold 19 during the period of the sample-taking, but the moment that the sample-taking chute 44 is swung to its upstanding inoperative position, the switch 29 closes and the circuits 28 and 25 again become live so that the motor 24 again drives the pump 22.

Another circumstance which opens the circuit for motor 24 and causes pump 22 to automatically stop is when switch 31 opens in response to failure of aggregate feed and deenergization of the vibrators, hereinbefore described.

With the described continuous mixing plant, for road surfacing material, the latter can be maintained most uniform in character, and meets the strict requirements which are established for such materials.

The mixing plant when in operation can supply the correct amount of aggregate in proportion to the bituminous binder; the arrangement be:ng that the proportion of each aggregate size can be separately controlled by the adjustment of the vibratory feeders 9.

The mixing plant, as described, is thus very practical and reliable, and requires a minimum of manual attention when in operation.

From the foregoing description it will be readily seen that there has been produced such a mixing plant as will substantially fulfill the objects of the invention, as set forth herein.

While this specification sets forth in detail the present and preferred construction of such mixing plant, still in practice such deviations from such detail may be resorted to as do not form a departure from the spirit of the invention, as defined by the appended claims.

Having thus described the invention, the following is claimed as new and useful, and upon which Letters Patent are desired:

1. In a mixing plant for road surfacing material, a bin having a plurality of compartments for aggregates, and means including a mixer-feeding chute to which the aggregates from the bin are delivered, a sample-taking chute mounted for motion between an inoperative position clear of the first named chute to an aggregate deflecting position projecting into said first named chute, means to so move the sample-taking chute, a scale bin to which the sample-taking chute feeds, said scale bin including a bottom discharge control gate, and a carry-off conveyor below said scale bin.

2. A mixing plant, as in claim 1, in which the sample-taking chute includes a trough corresponding to each feeder, and the scale bin including a separate compartment positioned to receive aggregate from the corresponding trough.

3. A structure as in claim 1, in which the plant includes means to feed liquid binder to the mixer, and means responsive to movement of the sample-taking chute to an aggregate deflecting position to cause stoppage of said binder feeding means.

4. A mixing plant, as in claim 3, in which said responsive means is adapted to cause starting of said feeding means upon the sample-taking chute being returned to inoperative position.

5. A mixing plant, for road surfacing material, comprising, on an upstanding frame, an aggregate bin having a bottom discharge spout of substantial inside diameter, a power actuated aggregate feeder below the spout in position to receive aggregate therefrom, a horizontal baffle disc of lesser diameter than the spout disposed in the latter, and means suspending the disc for free play laterally in said spout.

6. In a mixing plant for road surfacing material having an aggregate bin, means including a power actuated aggregate feeder to deliver aggregates from the bin to a mixer, power means to feed liquid bituminous binder into the aggregate as fed to said mixer, both of said power means being electrically actuated, a circuit for each power means, and switch means responsive to failure of aggregate feed in said feeder operative to open said circuits; a sample-taking and weighing mechanism on the frame including a sample-taking chute movable from an out-of-the-way position to an aggregate deflecting position in said first named chute, and means responsive to movement of the sample-taking chute to said aggregate deflecting position operative to open the circuit for the power means which feeds the bituminous binder.

7. In a mixing plant for road surfacing material, a bin having a plurality of compartments for aggregates, and means including a downwardly extending chute down which the aggregates from the bin flow; a sample-taking chute mounted below the feeders adjacent said first named chute but normally clear thereof, said sample-taking chute including a trough corresponding to each feeder, said sample-taking chute being mounted for motion to a working position in said first named chute deflecting the aggregates therefrom, means to so move the sample-taking chute, a multiple compartment scale bin in position to receive the deflected aggregates in bin compartments corresponding to said troughs, a scale beam assembly supporting the scale bin, and a scale actuated from said scale beam assembly.

8. A mixing plant, as in claim 7, including a bottom discharge gate in each of the scale bin compartments, a hopper below the scale bin, and a carry-off conveyor below the hopper.

CRAWFORD A. WILLIAMSON.

REFERENCES CITED

The following references are of record in the file of this patent:

UNITED STATES PATENTS

| Number | Name | Date |
|---|---|---|
| 156,068 | Searles | Oct. 20, 1874 |
| 1,288,621 | Larkin | Dec. 24, 1918 |
| 1,462,119 | Moetteli | July 17, 1923 |
| 1,663,173 | Pioda | Mar. 20, 1928 |
| 1,914,459 | Reider et al. | June 20, 1933 |
| 2,015,939 | Justus | Oct. 1, 1935 |
| 2,071,373 | Wurzback et al. | Feb. 23, 1937 |
| 2,285,765 | Carswell | June 9, 1942 |
| 2,298,160 | Pollitz | Oct. 6, 1942 |